UNITED STATES PATENT OFFICE.

WILLIAM SELLMAN, OF DORKING, ENGLAND.

PROCESS OF PREPARING LIQUID FOOD.

SPECIFICATION forming part of Letters Patent No. 605,190, dated June 7, 1898.

Application filed December 27, 1897. Serial No. 663,778. (No specimens.) Patented in England February 5, 1897, No. 3,095.

*To all whom it may concern:*

Be it known that I, WILLIAM SELLMAN, a subject of the Queen of Great Britain, residing at The Wheatsheaf, Dorking, county of Surrey, England, have invented certain new and useful Improvements in Liquid Food, (patented in Great Britain, No. 3,095, February 5, 1897,) of which the following is a specification.

This invention has for its object the manufacture of a liquid food from the compounding or association of food products. The food products consist of eggs, lemons, oranges, cereals, extracts of meats, poultry, cream, milk, honey, brandy, or other vinous liquid, prepared and treated and afterward mellowed in an old sherry-cask previous to being bottled off for use.

For the purpose of my invention I place thirty-six new-laid eggs in their shells in an earthen pan. I use the peel of thirty-six lemons and the juice of seventy-two lemons and spread the peel and juice over the eggs. I then place thirty-six more new-laid eggs on the lemons and their peel. I use the juice of twelve oranges and spread it over these, with two ounces of table-salt for assisting in dissolving the egg-shells. The pan is then closed and kept hermetically sealed for about seven days, by which time the shells have become dissolved by the acid of the fruit and the salt and the whole gelatinized. I then add two and one-half pounds of castor sugar. I boil twenty-five pounds of beef, twenty-five pounds of mutton, twenty-five pounds rabbit, and twenty-five pounds' weight of chickens, all being allowed to simmer to reduce the extract to about two ounces per pound. These extracts are then admixed with the gelatinous body before mentioned and well worked by a stirring rabble or scoop for complete association. During this stirring, which is done under heat, I insert one pint of crushed cereals—such as Quaker oats, arrowroot, pearl-barley, or the like—to bring the mixture up to a stiff paste. I then, while continuing the stirring, incorporate therewith three pints of cream and three pints of boiling milk and half a pound of honey. Finally I mix in about one-half gallon of cognac, a spirit liquor, or the like, which has a preservative property. The mass, now in creamy condition, is filtered or strained and then placed in an old sherry-cask to mellow, and during the following four weeks or so an occasional stirring or agitating is essential prior to the cask being tapped for bottling off the liquid.

The foregoing proportions when treated in the manner described will produce in the end about five gallons of liquid food specially rich in bone-forming and strengthening material, extremely nutritious, and very easily digested.

The quantity of the food to be taken will vary with the condition of an invalid—say from a teaspoonful to a table-spoonful—or in any kind of made-up food liquid—say bread and milk—or it may be in wine or other beverage.

What I claim, and desire to secure by Letters Patent, is—

1. The process or method herein described of manufacturing a food product which consists in placing new-laid eggs in their shells in a receptacle, covering said eggs with lemon peel and juice, placing more eggs in their shells in the receptacle and covering with orange-juice and salt, to assist in dissolving the egg-shells; hermetically sealing the receptacle for seven days; adding to this mass castor sugar, extract of beef, mutton, rabbit and chicken, crushed cereals, cream, boiling milk, honey and cognac, thoroughly mixing and filtering the mass and placing it in an old sherry-cask to mellow, as described.

2. The process or method herein described of manufacturing a liquid food (say five gallons) which consists in placing thirty-six new-laid eggs in their shells in a receptacle and covering said eggs with the peel of thirty-six lemons and the juice of seventy-two lemons, placing on the lemon-peel thirty-six more new-laid eggs and spreading over same the juice of twelve oranges and two ounces of salt to assist in dissolving the egg-shells, hermetically sealing the receptacle and keeping same closed for about seven days to allow the mass to become gelatinized by the action of the fruit and salt; adding to this mass two and one-half pounds of castor sugar; boiling twenty-five pounds each of beef, mutton, rabbit and chicken until reduced to about two ounces per pound and then well admixing same with the gelatinous body; adding thereto one pint of crushed cereals, three pints of cream, three pints of boiling milk, one-half pound of honey and one-half gallon of cognac; filtering the mass and placing same in an old
5 sherry-cask to mellow for about four weeks, substantially as set forth.

In testimony whereof I have hereunto set my hand in presence of two subscribing witnesses.

WILLIAM SELLMAN.

Witnesses:
 PERCY EBENEZER MATTOCKS,
 WILLIAM OSWALD BROWN.